(12) United States Patent
Barker et al.

(10) Patent No.: US 6,948,539 B1
(45) Date of Patent: Sep. 27, 2005

(54) MITER SAW TABLE SUPPORT DEVICE

(76) Inventors: Rex L. Barker, 22432 Center St. #101, Castro Valley, CA (US) 94546; Lynette D. Barker, 22432 Center St. #101, Castro Valley, CA (US) 94546

(*) Notice: Subject to any disclaimer, the term of this patent is extended or adjusted under 35 U.S.C. 154(b) by 88 days.

(21) Appl. No.: 10/666,133

(22) Filed: Sep. 22, 2003

(51) Int. Cl.[7] .................. B25H 1/04; B25H 1/12; B25H 1/14
(52) U.S. Cl. ............... 144/286.5; 144/285; 144/287; 83/471
(58) Field of Search .............. 144/285, 286.1, 144/286.5, 287; 108/69, 77, 80, 166, 167, 108/171; 312/313, 316; 269/289 R; 83/469, 83/471, 474, 477

(56) References Cited

U.S. PATENT DOCUMENTS

| | | | |
|---|---|---|---|
| 1,326,809 A | 12/1919 | Twiss | |
| 2,716,044 A * | 8/1955 | Overby | 108/166 |
| 3,261,307 A * | 7/1966 | Salkoff | 108/64 |
| 4,483,573 A * | 11/1984 | Keller | 312/281 |
| 4,874,025 A | 10/1989 | Cleveland | |
| 5,004,029 A | 4/1991 | Garner | |
| 5,161,590 A | 11/1992 | Otto | |
| 5,255,724 A * | 10/1993 | Butke | 144/329 |
| 5,329,979 A | 7/1994 | Miller et al. | |
| 5,664,612 A | 9/1997 | Klemma | |
| 5,722,473 A | 3/1998 | Tucker | |

* cited by examiner

Primary Examiner—Derris H. Banks
Assistant Examiner—Shelley Self

(57) ABSTRACT

A miter saw table support device includes a table having a panel and a plurality of legs that is are attached to and extend downwardly from the panel. Each of a pair of supports is attached to the top surface of the panel and are positioned adjacent to a front edge of the panel. The supports are spaced from each other such that a base of a miter saw may be selectively positionable between the supports. Each of a pair of guides is attached to one of the supports and extends outwardly away a respective one of the first and second side edges. The guides each have a break therein such that a first section and a second section of each of the guides are defined. Each of the first sections is hingedly coupled to a corresponding one of the second sections.

6 Claims, 4 Drawing Sheets

MITER SAW TABLE SUPPORT DEVICE

BACKGROUND OF THE INVENTION

1. Field of the Invention

The present invention relates to saw support tables and more particularly pertains to a new saw support table for providing positioning of a miter saw between a pair of guides which support wood to be cut by the miter saw.

2. Description of the Prior Art

The use of saw support tables is known in the prior art. While these devices fulfill their respective, particular objectives and requirements, the need remains for a device that is both portable and includes collapsible guides for holding varying sized portions of wood.

SUMMARY OF THE INVENTION

The present invention meets the needs presented above by including a panel that has a front edge, a rear edge, a first side edge, a second side edge, a top surface and a bottom surface. A plurality of legs is attached to and extends downwardly from the bottom surface. Each of a pair of supports is attached to the top surface of the panel. Each of the supports is positioned adjacent to the front edge. The supports are spaced from each other such that a base of a miter saw may be selectively positionable between the supports. Each of a pair of guides is attached to one of the supports and extends outwardly away a respective one of the first and second side edges. Each of the guides has a free end extending outwardly away from the table. The guides each have a break therein positioned generally between the free ends and the table such that a first section and a second section of each of the guides is defined. Each of the first sections is hingedly coupled to a corresponding one of the second sections such that the free ends may selectively be positioned in an extended position directed away from the table or stored position extending downward.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
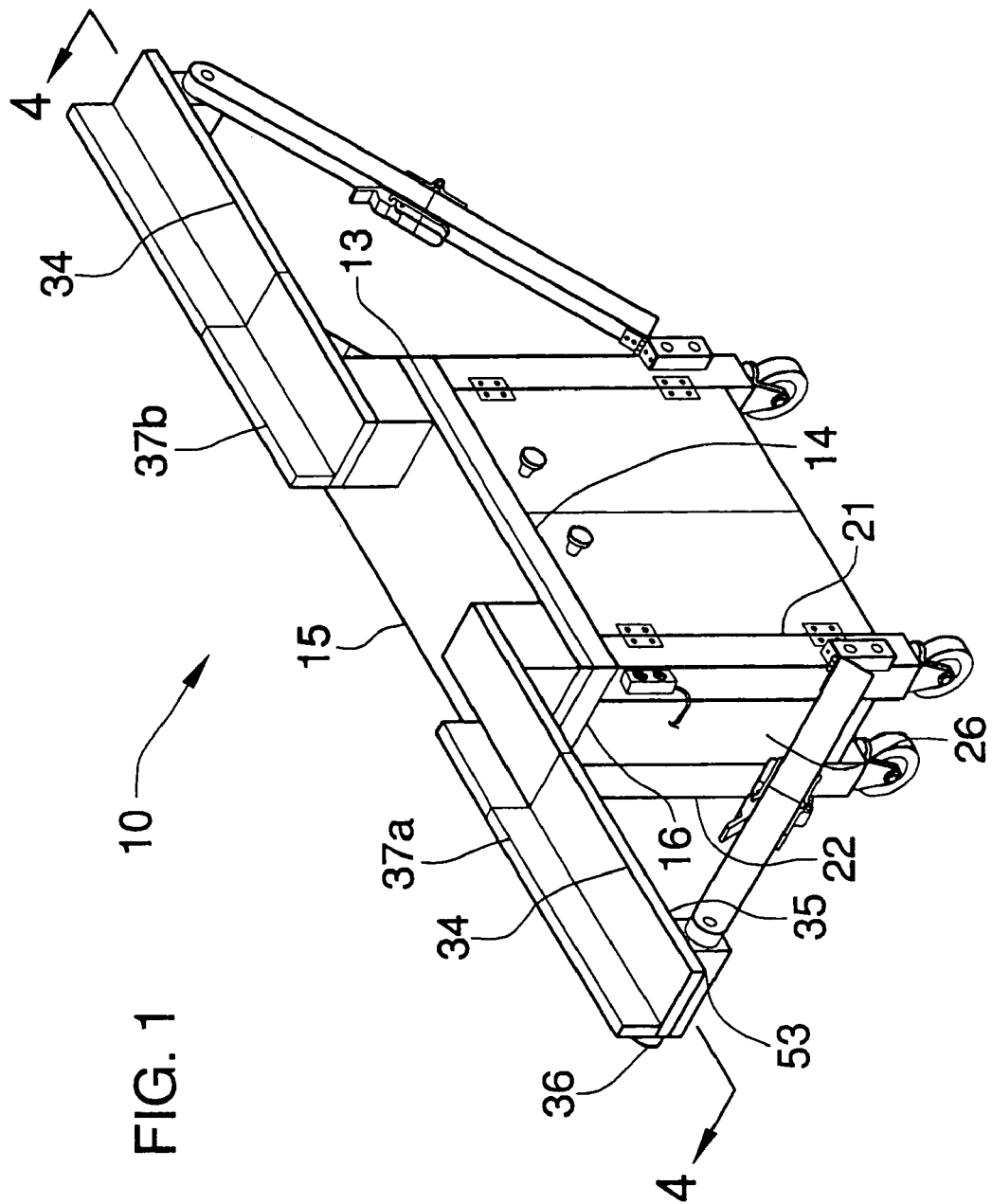
FIG. 1 is a schematic perspective view of a miter saw table support device according to the present invention.
Figure 2:
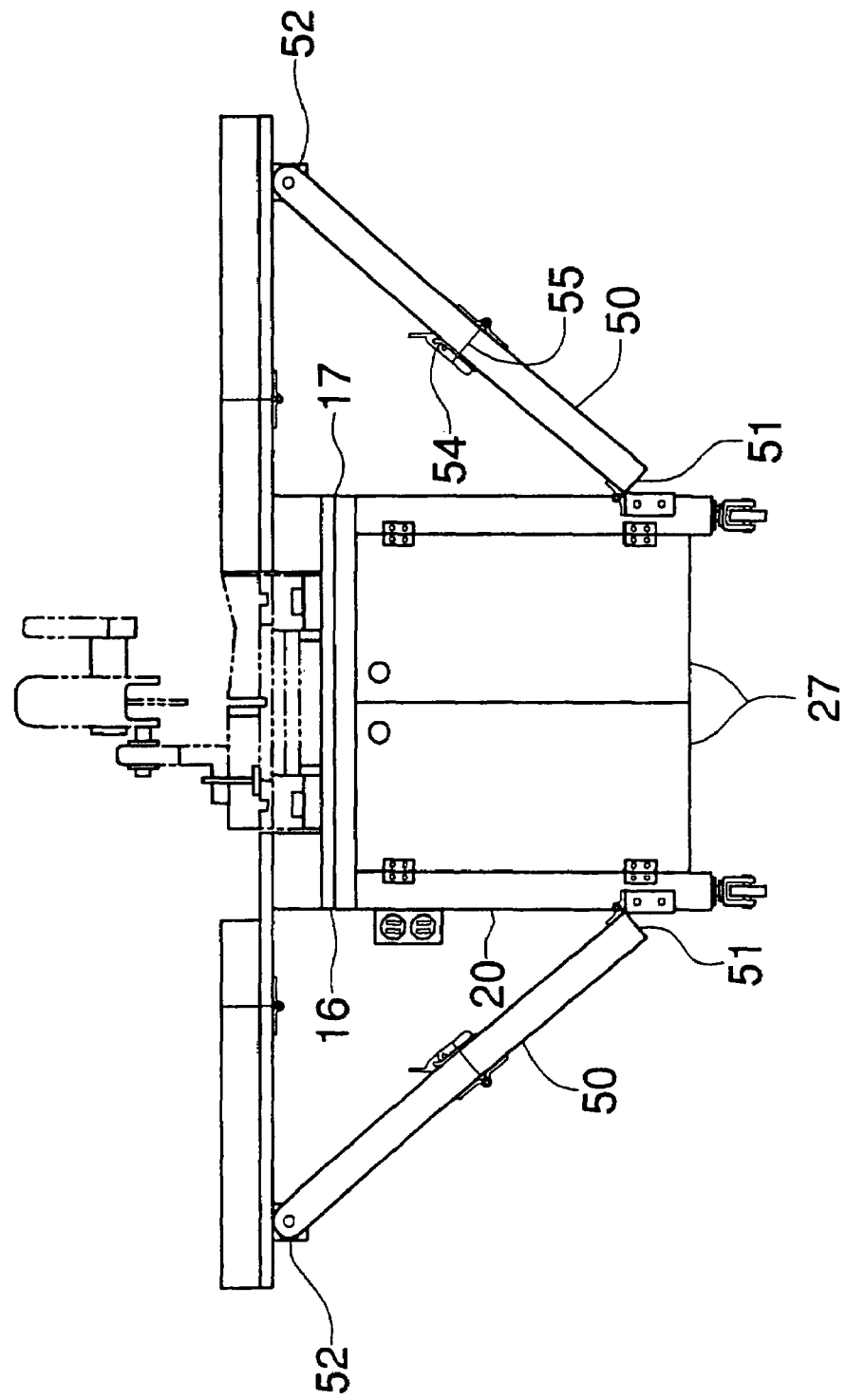
FIG. 2 is a schematic front view of the present invention.
Figure 3:
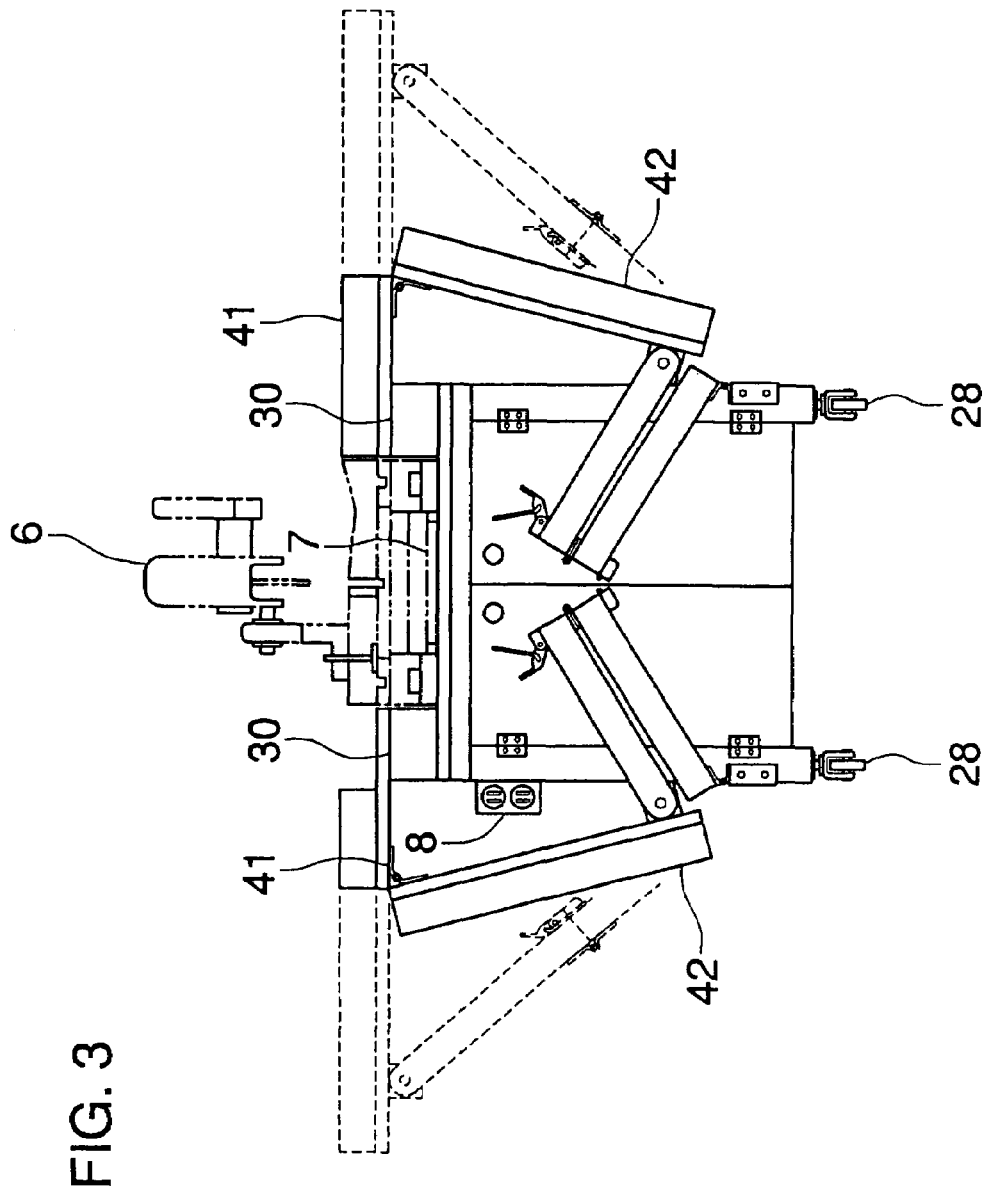
FIG. 3 is a schematic front view of the present invention.
Figure 4:
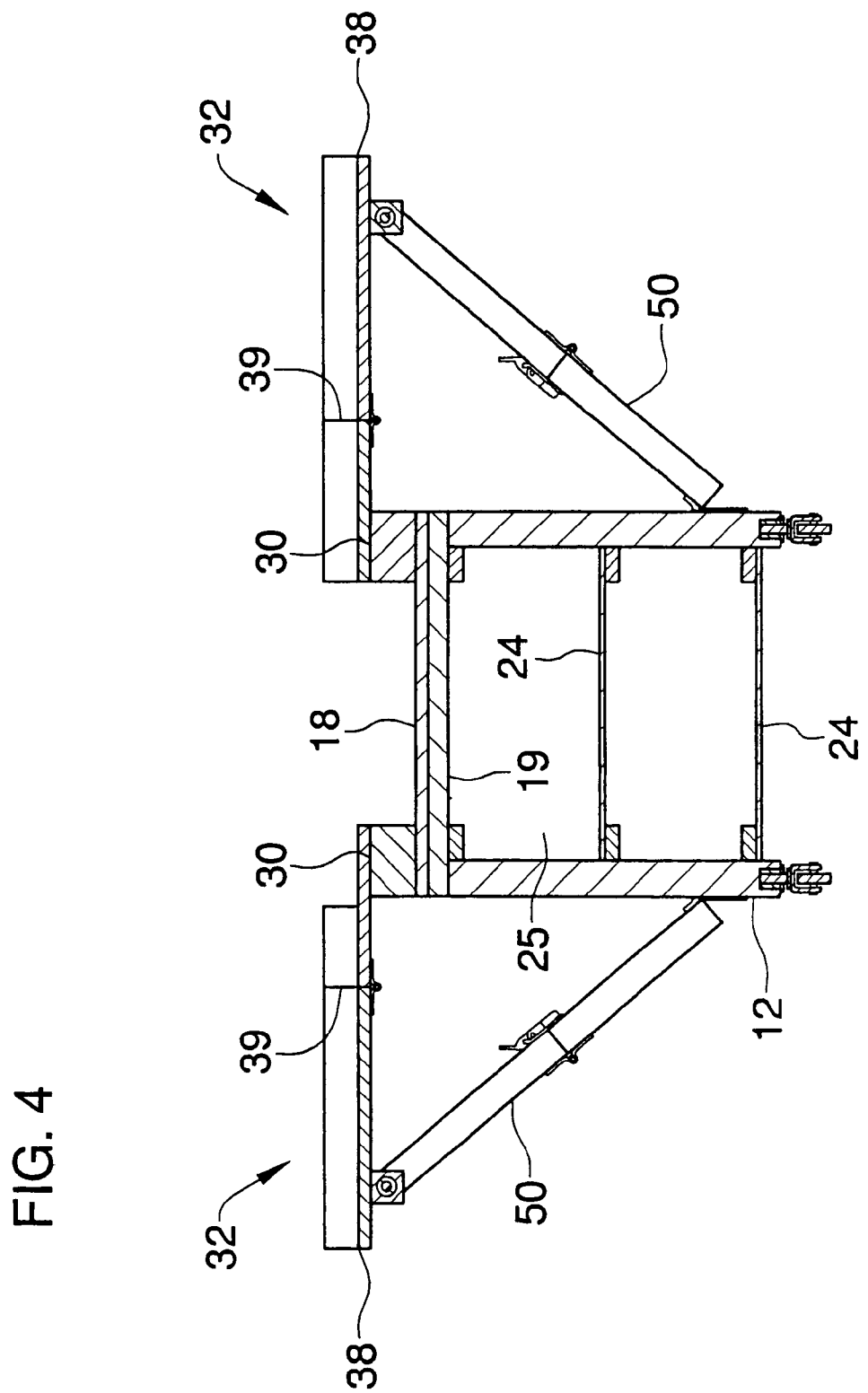
FIG. 4 is a schematic cross-sectional view taken along line 4—4 of FIG. 1 of the present invention.

With reference now to the drawings, and in particular to FIGS. 1 through 4 thereof, a new saw support table embodying the principles and concepts of the present invention and generally designated by the reference numeral 10 will be described.

As best illustrated in FIGS. 1 through 4, the miter saw table support device 10 generally comprises a table 12 including a panel 13 having a front edge 14, a rear edge 15, a first side edge 16, a second side edge 17, a top surface 18 and a bottom surface 19. A plurality of legs 20 is attached to and extends downwardly from the bottom surface 19. The plurality of legs 20 includes a pair of front legs 21 and a pair of rear legs 22 such that front side, a rear side and a pair of lateral sides of the table is defined. A plurality of shelves 24 is attached to the legs 20 and is generally parallel with the panel 13. A back wall 25 is attached to the table 12 and substantially covers the rear side, each of a pair of lateral walls 26 is attached to the table 12 and substantially covers one of the lateral side, and each of a pair doors 27 is hingedly coupled to the table 12 for selectively opening or closing the front side of the table 12. Preferably, each of a plurality of wheels 28 is rotatably coupled to a bottom side of one of the plurality of legs 20.

Each of a pair of supports 30 is attached to the top surface 18 of the panel 13 and are is positioned adjacent to the front edge 14. Each of the supports 30 is positioned adjacent to one of the first 16 and second 17 side edges. The supports 30 are spaced from each other such that a base 7 of a miter saw 6 is selectively positionable between the supports 30.

Each of a pair of guides 32 is attached to one of the supports 32 and extends outwardly away a respective one of the first 16 and second 17 side edges. The guides 32 each include a horizontal wall 34 having a forward edge 35 and rearward edge 36. The horizontal walls 34 do not extend into the space between the supports 30 and a distance from the panel 13 to a top side of the horizontal walls 34 is substantially equal to a height of the base 7. This height may vary depending on the miter saw 6 used but will generally between 3 inches and 6 inches. Each of the forward edges 35 is generally co-planar with the front edge 14 of the panel 13. The guides 32 each include a vertical wall 37a, 37b that is attached to and extends upwardly away from one of the horizontal walls 32. The vertical walls 37a, 37b extend along a respective one of the rearward edges 36. However, it is preferred that the vertical wall 37a positioned adjacent to the first side edge 16 does not extend over the table 12 and only extends outwardly from the first side edge 16 to ensure that it does not interfere with the miter saw 6 when it is placed in an angular orientation with its base 7. Each of the guides 32 has a free end 38 extending outwardly away from the table 12. Each of the guides 32 has a break 39 therein positioned generally between the table 12 and the free ends 38 such that a first section 41 and a second section 42 of each of the guides 32 is defined. The first sections 41 are each hingedly coupled to a corresponding one of the second sections 42 such that the free ends 38 may selectively be positioned in an extended position directed away from the table 12 or stored position extending downward.

A pair of articulated arms 50 each has a first end 51 hingedly attached to the table 12 and a second end 52 pivotally attached to one of the second sections 42 for selectively supporting the second sections 42 in the extended position. Preferably, the second ends 52 are each attached by a bracket 53 to the second sections 42 such that the arms 50 are not positioned beneath the horizontal members 34. This allows the first ends 51 to be attached to the front side of the table 12 so that the arms 50 are positionable in front of the front side of the table 12 when the second sections 42 are placed in the stored position. Locking members 54 are positioned on the joints 55 of the arms 50 for locking the arms 50 in an extended position.

In use, the miter saw 6 is positioned between the supports 30. Elongated portions of wood may be placed on the guides 32 so that they are supported along more of their length to ensure stability during cutting. Clamps may be positioned on the guide 32 for securing the wood on the guides 32. The shelves 24 may be used for storage and outlets 8 may be secured to the table 12 to provide electricity to the miter saw 6.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A collapsible miter saw support device for supporting a miter saw and material to be cut by the miter saw, said device comprising:
    a table including a panel having a front edge, a rear edge, a first side edge, a second side edge, a top surface and a bottom surface, a plurality of legs being attached to and extending downwardly from said bottom surface, said legs including a pair of front legs and a pair of rear legs, said table including a front side, a rear side and a pair of lateral sides;
    a pair of supports, each of said supports being attached to said top surface of said panel, each of said supports being positioned adjacent to said front edge, said supports being spaced from each other such that a base of the miter saw is selectively positionable between said supports; and
    a pair of guides, each of said guides being attached to one of said supports and extending outwardly away a respective one of said first and second side edges, each of said guides having a free end extending outwardly away from said table, each of said guides having a break therein positioned generally between said table and said free ends such that a first section and a second section of each of said guides is defined, each of said first sections being hingedly coupled to a corresponding one of said second sections such that said free ends may selectively be positioned in an extended position directed away from said table or stored position extending downward, each of said guides includes a horizontal wall having a forward edge and rearward edge, each of said forward edges being generally co-planar with said front edge of said panel, each of said guides including a vertical wall being attached to and extending upwardly away from one of said horizontal walls, each of said vertical walls extending along a respective one of said rearward edges;
    a pair of articulated arms each having a first end hingedly attached to said table and a second end pivotally attached to one of said second sections for selectively supporting said second sections in said extended position, each of said arms is positioned in front of said front side of said table when said guides are positioned in said stored position.

2. The device of claim 1, further including a plurality of shelves being attached to said legs and being generally parallel with said panel.

3. The device of claim 2, further including a back wall being attached to said table and substantially covering said rear side, each of a pair of lateral walls being attached to said table and substantially covering one of said lateral sides, each of a pair doors being hingedly coupled to said table for selectively opening or closing said front side of said table.

4. The device of claim 1, further including a plurality of wheels, each of said wheels being rotatably coupled to a bottom side of one of said plurality of legs.

5. The device of claim 1, wherein said vertical wall positioned adjacent to said first side edge extends outwardly from said first side of said panel.

6. A collapsible miter saw support device for supporting a miter saw and material to be cut by the miter saw, said device comprising:
    a table including a panel having a front edge, a rear edge, a first side edge, a second side edge, a top surface and a bottom surface, a plurality of legs being attached to and extending downwardly from said bottom surface, said plurality of legs including a pair of front legs and a pair of rear legs such that front side, a rear side and a pair of lateral sides of said table is defined, a plurality of shelves being attached to said legs and being generally parallel with said panel, a back wall being attached to said table and substantially covering said rear side, each of a pair of lateral walls being attached to said table and substantially covering one of said lateral sides, each of a pair doors being hingedly coupled to said table for selectively opening or closing said front side of said table;
    a plurality of wheels, each of said wheels being rotatably coupled to a bottom side of one of said plurality of legs;
    a pair of supports, each of said supports being attached to said top surface of said panel, each of said supports being positioned adjacent to said front edge, each of said supports being positioned adjacent to one of said first and second side edges, said supports being spaced from each other such that a base of the miter saw is selectively positionable between said supports;
    a pair of guides, each of said guides being attached to one of said supports and extending outwardly away a respective one of said first and second side edges, each of said guides including a horizontal wall having a forward edge and rearward edge, each of said forward edges being generally co-planar with said front edge of said panel, each of said guides including a vertical wall being attached to and extending upwardly away from one of said horizontal walls, each of said vertical walls extending along a respective one of said rearward edges, each of said guides having a free end extending outwardly away from said table, each of said guides having a break therein positioned generally between said table and said free ends such that a first section and a second section of each of said guides is defined, each of said first sections being hingedly coupled to a corresponding one of said second sections such that said free ends may selectively be positioned in an extended position directed away from said table or stored position extending downward; and
    a pair of articulated arms each having a first end hingedly attached to said table and a second end pivotally attached to one of said second sections for selectively supporting said second sections in said extended position.

* * * * *